Figure 1:
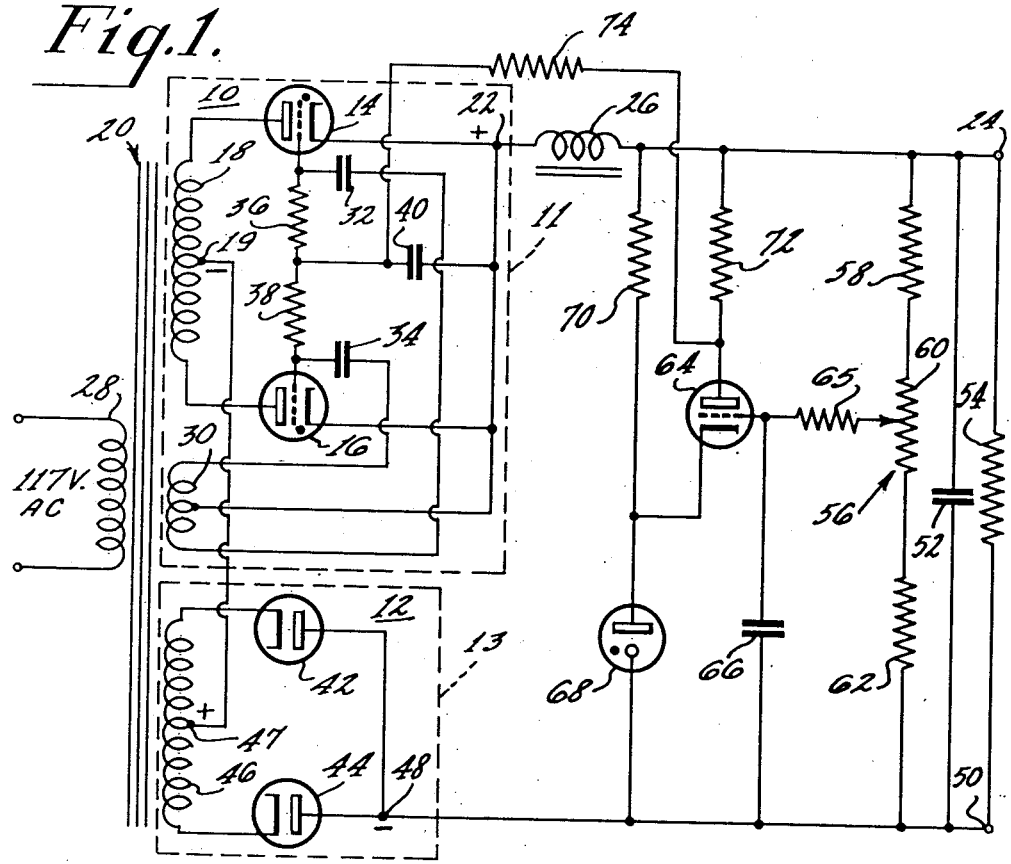

Sept 17, 1957  H. J. WOLL  2,806,963
REGULATED POWER SUPPLIES
Filed June 24, 1955

INVENTOR.
Harry J. Woll
BY
ATTORNEY.

United States Patent Office 2,806,963
Patented Sept. 17, 1957

2,806,963

REGULATED POWER SUPPLIES

Harry J. Woll, Haddon Heights, N. J., assignor to Radio Corporation of America, a corporation of Delaware Application June 24, 1955, Serial No. 517,685

9 Claims. (Cl. 307—52)

This invention relates to regulated power supplies, and more particularly to power supplies of the type wherein a regulated unidirectional output voltage is the sum of the output voltages of a plurality of separate voltage sources. Power supplies in accordance with the present invention may employ one or more transistors for one of its voltage sources. The transistors may be of the type having peak forward voltage ratings that are less than the total regulated output voltage of the power supplies of which they form a part.

In most conventional regulated power supplies using controlled rectifiers, such as thyratrons or transistors, the output voltage can be regulated from substantially zero up to approximately 60 percent of the rated peak forward voltage. In many applications of such power supplies, this range of control may not be needed. This is especially true where the source of input voltage to the power supply is the 110 volts A.-C. (alternating current) supplied by public utilities, and where fluctuations in the load on the power supply are relatively small.

Accordingly, it is an object of the present invention to provide improved regulated power supplies wherein a relatively high output voltage is regulated by means of a voltage source having a relatively limited output voltage.

Another object of the present invention is to provide improved regulated power supplies comprising a plurality of voltage sources connected in series to provide a relatively high total output voltage, and to regulate this total output voltage by means of control signals fed back to only one of the voltage sources.

Still another object of the present invention is the provision in power supplies, adapted to supply a relatively high regulated output voltage, of means for attaining regulation of the total output voltage with only a portion of the voltage source responsible for the total output voltage.

A further object of the present invention is to provide improved regulated power supplies that are simple in construction and operation, economical to manufacture and highly efficient in use.

In accordance with the present invention, the foregoing and other related objects and advantages are attained in a regulated power supply comprising a plurality of voltage sources wherein only one is adjusted or controlled by control signals derived from the total output voltage of all of the voltage sources. All of the voltage sources comprising the power supply are connected in series to provide a relatively high total output voltage. A sample of this total output voltage is fed back degeneratively to only one of the voltage sources to control the rectification thereof, and thereby to control its output voltage. Since the total output voltage of the power supply includes the output voltage of the controlled voltage source, the total output voltage of the power supply may thus be regulated. Thus, where a transistor voltage source is one of the voltage sources in a power supply comprising a plurality of voltage sources, transistors with a peak forward voltage of 50 volts, for example, can be used as controlled rectifiers in a power supply designed to provide a total regulated output voltage of 150 volts. Because transistors are generally more efficient in their operation than electron discharge devices employing hot cathodes, the overall efficiency of the power supply may be increased by employing transistors therein.

Figure 2:
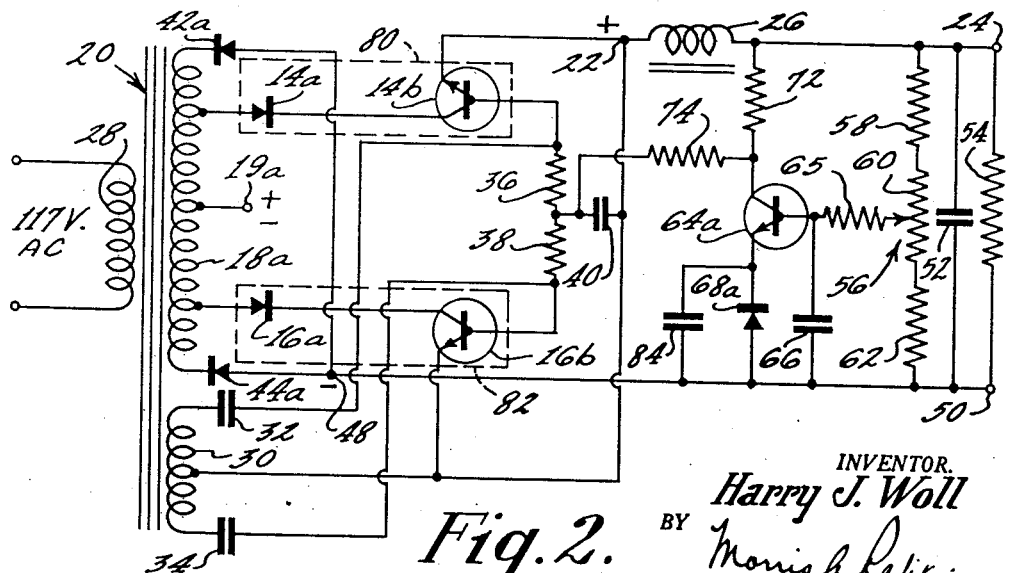

The novel features of the present invention, as well as the invention itself, both as to its organization and method of operation, will be understood in detail from the following description when considered in connection with the accompanying drawing in which similar reference characters represent similar parts, and in which:

Fig. 1 is a schematic diagram of an improved regulated power supply, in accordance with the present invention, and Fig. 2 is a modification of the regulated power supply of Fig. 1, in accordance with the present invention.

Referring now particularly to Fig. 1, there is shown a regulated power supply, in accordance with the present invention, comprising a first voltage source 10, included within the dashed rectangle 11, and a second voltage source 12, included within the dashed rectangle 13. The first voltage source 10 comprises a pair of rectifying devices 14 and 16, such as thyratrons. The anodes of the thyratrons 14 and 16 are connected to each other through a center-tapped secondary winding 18 of a power transformer 20. The center-tap 19 of the secondary winding 18 is also the negative output means, or terminal, of the voltage source 10. The cathodes of the thyratrons 14 and 16 are connected to each other and to a terminal 22 which is the positive output means of the first voltage source 10. The positive output means, or terminal 22, of the voltage source 10 is connected to a positive output terminal 24 of the regulated power supply through a choke 26, for filtering purposes.

A primary winding 28 of the power transformer 20 is adapted to be connected to any source of suitable alternating voltage, such as a 117 volt A.-C. outlet. Means are provided to control the time of firing of the thyratrons 14 and 16, thereby controlling the output voltage thereof. To this end, each control electrode, or control grid, of each of the thyratrons 14 and 16 is connected to a separate end, respectively, of a center-tapped tertiary winding 30 through capacitors 32 and 34, respectively. The center-tap of the tertiary winding 30 is connected to the cathodes of the thyratrons 14 and 16. The capacitors 32 and 34 provide a phase shift of approximately 90° to the voltage applied to the grids of the thyratrons 14 and 16 with respect to the voltage applied to their anodes. The control grids of the thyratrons 14 and 16 are connected to each other by serially connected resistors 36 and 38. The common junction of the resistors 36 and 38 is connected to the positive terminal 22 through a blocking capacitor 40.

It will now be understood that the first voltage source 10, comprising the thyratrons 14 and 16 connected as full-wave rectifiers, is adapted to rectify the alternating voltage induced in the secondary winding 18 by the primary winding 28 and to provide a unidirectional voltage between the positive output terminal 22 and the center-tap 19.

The second voltage source 12 comprises a pair of diode rectifiers 42 and 44 connected in a circuit to provide full-wave rectification. The cathodes of the diodes 42 and 44 are connected to each other through a center-tapped quaternary winding 46 of the power transformer 20. The center-tap 47 of the quaternary winding 46 is the positive output means, or terminal, of the voltage source 12. The anodes of the diodes 42 and 44 are connected to each other and to a negative output terminal 48 which comprises the negative output means of the second voltage source 12.

The center-tap 19 of the secondary winding 18 is connected to the center-tap 47 of the quaternary winding 46. The negative output terminal 48 of the voltage source 12 is connected to a negative output terminal 50 of the regulated power supply. Thus, it will be understood that the first voltage source 10 is connected in a series aiding relationship with the second voltage source 12 to provide a total output voltage between the output terminal 24 and 50 that is substantially the sum of the individual output voltages of the first and second voltage sources 10 and 12, disregarding the voltage drop in the choke 26. A filtering capacitor 52 is connected between the positive output terminal 24 and the negative output terminal 50 of the regulated power supply. A load 54, represented herein as a resistor, is connected between the positive and negative output terminals 24 and 50.

Means are provided to regulate the total output voltage between the positive and negative output terminals 24 and 50 supplied to the load 54. To this end, a voltage divider 56, comprising a resistor 58, a potentiometer 60 and a resistor 62, connected in series with each other, is connected between the positive and negative output terminals 24 and 50. The movable tap of the potentiometer 60 is connected to the grid of an amplifier 64, represented herein as a triode, through a resistor 65. The control grid of the amplifier 64 is connected to the negative output terminal 50 through a capacitor 66. The cathode of the amplifier 64 is maintained at a constant voltage with respect to the negative output terminal 50 by being connected thereto through a voltage regulating device, such as a voltage regulating tube 68. The anode of the voltage regulating tube 68 is connected to the positive output terminal 24 through a current limiting resistor 70. The anode of the amplifier 64 is connected to the positive output terminal 24 through a load resistor 72. It will now be understood that a sample of the total output voltage between the positive and negative output terminals 24 and 50 may be sensed by the control grid of the amplifier 64 via the movable tap on the potentiometer 60 and the resistor 65.

Means are provided to feed back a sample of the total output voltage to control the rectification of the thyratrons 14 and 16. To this end, the anode of the amplifier 64 is connected to the common junction of the resistors 36 and 38 through a resistor 74.

The operation of the regulated power supply illustrated in Fig. 1 will now be described. Let it be assumed that, either because a change in the load 54 and/or because of a change in the alternating voltage input to the primary winding 28 of the power transformer 20, there is a tendency for the output voltage between the positive and negative output terminals 24 and 50 to increase. The voltage sampled by the tap on the potentiometer 60 of the voltage divider 56 also tends to increase and drives the control grid of the amplifier 64 in a positive direction. Since the cathode of the amplifier 64 is maintained substantially constant, because of the constant voltage across the regulating tube 68, conduction through the amplifier 64 will tend to increase with the positive-going signal applied to the control grid thereof. Under these conditions, a negative-going voltage is obtained at the anode of the amplifier 64 and is applied to the grids of the thyratrons 14 and 16, via the resistors 74, 36 and 38. The effect of a negative-going voltage at the grids of the thyratrons 14 and 16 is to delay the firing of the thyratrons 14 and 16, and thereby decrease the output voltage available at the positive and negative terminals 22 and 19 of the first voltage source 10. Thus, the period of rectification of the thyratrons 14 and 16 is decreased. Since the first voltage source 10 is connected in series with the second voltage source 12, and since the output voltage between the positive and negative terminals 24 and 50 comprises the sum of the output voltages of the first and second voltage sources 10 and 12, decreasing the output voltage available from the voltage source 10 will decrease the output voltage available between the positive and negative output terminals 24 and 50. Thus, any tendency for the voltage between the positive and negative output terminals 24 and 50 to increase is offset by a decrease in the voltage supplied by one of the voltage sources that supplies a portion of the total output voltage of the regulated power supply. It will be understood that any tendency for the output voltage between the positive and negative output terminals 24 and 50 to decrease will give rise to a reverse set of conditions whereby the output voltage from the voltage source 10 will tend to increase and thereby offset the tendency for the total output voltage to decrease. Under these conditions, a positive-going signal is applied to the grids of the thyratrons 14 and 16 to increase the periods of rectification thereby.

Referring now to Fig. 2, there is shown a power supply, in accordance with the present invention, employing transistors. Reference characters similar to those in Fig. 1 have been used in Fig. 2 for components having the same function as in Fig. 1, it being understood that the specific size or value of these components will vary in accordance with the particular tube or transistor that may be employed. In Fig. 2, a first voltage source comprises diodes 14a and 16a. The diodes 14a and 16a may be of the germanium or silicon types. Each of the anodes of the diodes 14a and 16a are connected to separate points on opposite sides of a center-tap 19a of a secondary winding 18a of the power transformer 20. The cathode of the diode 14a is connected to the collector electrode of a transistor 14b of the n-p-n type, for example. The emitter of the transistor 14b is connected to the positive output terminal 22 of the first voltage source. In a similar manner, the cathode of the diode 16a is connected to the collector of a transistor 16b, similar to the transistor 14b. The emitter of the transistor 16b is also connected to the positive output terminal 22. The bases of the transistors 14b and 16b are connected to each other through the serially connected resistors 36 and 38.

The diode 14a and the transistor 14b, enclosed within the dashed rectangle 80, comprises a time controlled rectifier whose function is similar to that of a thyratron, employed as a rectifier, as will be explained hereinafter. In a similar manner, the diode 16a and the transistor 16b, enclosed within the dashed rectangle 82 also functions as a time controlled rectifier.

A second voltage source, for providing a portion of the regulated output voltage between the output terminals 24 and 50 of the power supply, comprises the diodes 42a and 44a. The cathodes of the diodes 42a and 44a are connected to each other through the center-tap secondary winding 18a. The anodes of the diodes 42a and 44a are connected to each other and to the negative output terminal 48. The diodes 42a and 44a may be of the germanium or silicon type, for example.

It will now be understood that the diodes 42a and 44a are connected as a full-wave rectifier to rectify the voltage transformed by the secondary winding 18a, and to produce a unidirectional voltage between the center-tap 19a and the negative output terminal 48. With respect to the voltage source comprising the diodes 14a and 16a and the transistors 14b and 16b, the center-tap 19a of the secondary winding 18a is a negative output terminal, the terminal 22 being the positive output terminal. Thus, the first voltage source, comprising the diodes 14a and 16a, is connected in series with the second voltage source comprising the diodes 42a and 44a. Disregarding the voltage drop across the choke 26, it will be seen that the voltage supplied to the load 54, in Fig. 2, is the sum of the aforementioned first and second voltage sources.

Samples of the output voltage to the load 54 that are sensed by the tap on the potentiometer 60 of the voltage divider 56, as described above are fed back to the first voltage source, comprising the transistors 14b and 16b, via an amplifier 64a, of the n-p-n transistor type. The base of the amplifier 64a is connected to the tap on the potentiometer 60 through the resistor 65. The collector of the amplifier 64a is connected to the junction of the resistors 72 and 74, and the emitter of the amplifier 64a is connected to the negative output terminal 50 of the power supply through a Zener diode 68a. The Zener diode 68a is bypassed to the negative output terminal 50 by a capacitor 84.

The Zener diode 68a may be a p-n germanium rectifier poled in a manner whereby current flows through it in the reverse or high resistance direction. The function of the Zener diode 68a is to maintain the emitter of the amplifier 64a at a substantially constant voltage.

The regulated power supply illustrated in Fig. 2 will now be explained, in accordance with the principles of the present invention. The first voltage source, comprising the diodes 14a and 16a and the transistors 14b and 16b, is connected to provide full-wave rectification of the transformed alternating voltage of the portion of the secondary winding 18a appearing between the anodes of the diodes 14a and 16a. The tertiary winding 30 supplies voltages to the bases of the transistors 14b and 16b that are phase shifted approximately 90°, with respect to the voltages appearing at the collectors thereof, because of the capacitors 32 and 34. The voltages thus supplied to the bases of the transistors 14b and 16b are such as to control the period of rectification of the diodes 14a and 16a alternately. Under these conditions, it will be understood that by biasing the bases of the transistors 14b and 16b more negatively, for example, the unidirectional output voltage that will appear between the terminals 22 and 19a of the first voltage source will decrease. Biasing the bases of the transistors 14b and 16b positively will have the effect of advancing the time of initiating conduction so that the output voltage between the terminals 22 and 19a will increase.

Let it be assumed, for example, that the voltage appearing across the load 54, connected between the output terminals 24 and 50 of the power supply, in Fig. 2, tends to decrease. This may occur when the resistance of the load 54 is decreased. A sample voltage, or control signal, of the decreasing output voltage is sensed by the tap on the potentiometer 60 of the voltage divider 56, and applied to the base of the amplifier 64a. Since the emitter of the amplifier 64a is maintained substantially constant with respect to the negative output terminal 50, by the Zener diode 68a, the voltage appearing at the collector of the amplifier 64a will be positive-going under these conditions. This latter positive-going voltage is applied to the bases of the transistors 14b and 16b through the resistors 74, 36 and 38. The positive-going voltage applied to the bases of the transistors 14b and 16b results in advancing the time of the initiation of conduction of the diodes 14a and 16a, and thereby increasing the voltage available from the output terminals 22 and 19a of the first voltage source. Thus, the period of rectification by the diodes 14a and 16a may be said to have increased. Since the first voltage source is connected in series with the second voltage source, comprising the diodes 42a and 44a, the voltage between the output terminals 24 and 50 of the regulated power supply tends to increase, and thereby offsets the original tendency of the output voltage to decrease. It will be understood, also, that any tendency for the output voltage, across the load 54, in Fig. 2, to increase will result in a reverse set of conditions, whereby the bases of the transistors 14b and 16b will be biased more negatively. This will tend to decrease the period of rectification of the diodes 14a and 16a. Under these conditions, the original tendency of the output voltage across the load 54 to increase will be offset by the decrease in the voltage resulting in the first voltage source.

What is claimed is:

1. In a power supply for supplying a regulated unidirectional voltage to a load circuit, a first source of unidirectional voltage, a second source of unidirectional voltage, a pair of output terminals for connecting said load circuit therebetween, means connecting said first and said second sources of voltage in a series circuit between said pair of output terminals, and means responsive to the voltage between said pair of output terminals for controlling the voltage of said first source only.

2. A regulated power supply comprising first and second sources of unidirectional voltage each having positive and negative output means, said negative output means of said first source of voltage being connected to said positive output means of said second source of voltage, means to connect a load between said positive output means of said first source of voltage and said negative output means of said second source of voltage for applying a voltage to said load, means connected between said last-mentioned positive and negative output means to derive a sample of said voltage applied to said load, and means to feed back said sample voltage to said first source of voltage for controlling the voltage output thereof in accordance with the amplitude of said sample voltage.

3. A regulated power supply comprisng first and second unidirectional voltage sources, said first voltage source comprising alternating voltage rectifying means and means for controlling the period of rectification of said rectifying means, means connecting said first and second voltage sources in a series aiding relationship with each other, means for applying the sum of the output voltages of said first and second voltage sources to a load, means for obtaining a sample of the output voltage applied to said load, and means connected between said last-mentioned means and said means for controlling the period of rectification of said rectifying means in said first voltage source for controlling the output voltage of said first voltage source in response to said sample voltage.

4. A regulated power supply comprising a plurality of unidirectional voltage sources, one of said voltage sources comprising alternating voltage rectifying means and means for controlling the period of rectification of said rectifying means, means connecting each of said plurality of voltage sources in series aiding relationship with each other, means for applying the sum of the output voltages of each of said plurality of voltage sources to a load, means for obtaining a sample of the output voltage applied to said load, and means connected between said last-mentioned means and said means for controlling the period of rectification of said rectifying means in said one of said voltage sources for controlling the output voltage thereof in response to said sample voltage.

5. A power supply for supplying a regulated unidirectional voltage to a load circuit comprising a first source of unidirectional voltage, a second source of unidirectional voltage, a pair of output terminals for connecting said load circuit therebetween, means connecting said first and said second sources of voltage in series between said pair of output terminals, said first source of voltage comprising at least one thyratron having an anode, a cathode and a grid, means to apply alternating voltages to said anode and to said grid and comprising means to shift the phase of the alternating voltage applied to said grid approximately 90° with respect to the alternating voltage applied to said anode, means connected between said pair of output terminals to obtain a sample of the voltage applied to said load circuit, and means to feed back said sample voltage to said grid to control the period of rectification of said thyratron in response to said sample voltage.

6. A regulated power supply comprising first and second unidirectional sources of voltage, a pair of output terminals, means connecting said first and second sources of voltage in series aiding relationship between said output terminals, said first source of voltage comprising a pair of thyratrons each having an anode, a cathode and a grid, means to apply an alternating voltage to said anodes and to said grids, said last-mentioned means comprising means to shift the phase of the voltage applied to each grid approximately 90° with respect to the voltage applied to its respective anode in each thyratron, means to obtain a sample of the voltage between said pair of output terminals, and means to feed back said sample voltage to each of said grids to control the period of rectification of each of said thyratrons in accordance with the amplitude of said sample voltage.

7. A regulated power supply comprising a first and a second unidirectional voltage source connected to each other in a series aiding relationship, a pair of output terminals for applying a load therebetween, means connecting said serially connected first and second voltage sources between said output terminals, said first voltage source comprising at least a rectifier having an anode and a cathode and a transistor having a collector, a base and an emitter, means connecting said emitter to one of said pair of output terminals, means connecting said cathode to said collector, means to apply an alternating voltage to said anode, means connected between said pair of output terminals to obtain a sample of the voltage therebetween, and means to feed back said sample voltage to said base to control the period of rectification of said rectifier.

8. A regulated power supply comprising a plurality of unidirectional voltage sources connected to each other in a series aiding relationship, a pair of output terminals for applying a load therebetween, means connecting said serially connected voltage sources between said output terminals, one of said voltage sources comprising at least a rectifier having an anode and a cathode and a transistor having a collector, a base and an emitter, means connecting said emitter to one of said pair of output terminals, means connecting said cathode to said collector, means to apply an alternating voltage to said anode, means connected between said pair of output terminals to obtain a sample of the voltage therebetween, and means to feed back said sample voltage to said base to control the period of rectification of said rectifier.

9. In a power supply for supplying a regulated unidirectional voltage to a load circuit, a plurality of unidirectional voltage sources, a pair of output terminals for connecting said load circuit therebetween, means for connecting said plurality of voltage sources in a series aiding relationship between said pair of output terminals, one of said plurality of voltage sources comprising means to rectify an alternating voltage, means connected between said output terminals to obtain a sample of the voltage therebetween, and means connected between said last-mentioned means and said rectifying means to control the period of rectification of said alternating voltage in accordance with the amplitude of said sample voltage.

References Cited in the file of this patent
UNITED STATES PATENTS 2,443,534    Eglin _____ June 15, 1948